United States Patent [19]

Omoto et al.

[11] Patent Number: 4,609,786

[45] Date of Patent: Sep. 2, 1986

[54] BAND AND THE HEADPHONE UTILIZING THE SAME

[75] Inventors: Hideo Omoto; Takao Nakaya, both of Hamamatsu, Japan

[73] Assignee: Nippon Gakki Seizo Kabushiki Kaisha, Hamamatsu, Japan

[21] Appl. No.: 660,132

[22] Filed: Oct. 12, 1984

[30] Foreign Application Priority Data

| | | | |
|---|---|---|---|
| Oct. 13, 1983 | [JP] | Japan | 58-158616[U] |
| Oct. 13, 1983 | [JP] | Japan | 58-158617[U] |
| Oct. 13, 1983 | [JP] | Japan | 58-158618[U] |
| Aug. 27, 1984 | [JP] | Japan | 59-130100[U] |

[51] Int. Cl.[4] ...................... H04M 1/05; A01K 27/00; A42B 1/06; A44C 5/08

[52] U.S. Cl. .................................... 179/156 R; 2/209; 63/5 R; 63/9; 119/106; 224/164; 224/175

[58] Field of Search ........... 179/156 R, 156 A, 182 R; 63/5 R, 9; 2/311, 314, 317, 209; 119/106; 224/164, 174, 175; 428/12

[56] References Cited

U.S. PATENT DOCUMENTS

| | | | |
|---|---|---|---|
| 2,120,348 | 6/1938 | Bezault | 63/9 |
| 4,517,418 | 5/1985 | Baran et al. | 179/156 R |

FOREIGN PATENT DOCUMENTS

| | | | |
|---|---|---|---|
| 543838 | 7/1957 | Canada | 63/9 |
| 741692 | 9/1943 | Fed. Rep. of Germany | 179/156 R |
| 59-180587 | 12/1984 | Japan . | |

*Primary Examiner*—Gene Z. Rubinson
*Assistant Examiner*—Danita R. Byrd
*Attorney, Agent, or Firm*—Cushman, Darby & Cushman

[57] ABSTRACT

A band comprising many beam portions and arcuate hinge portions formed integrally so as to be alternately arranged, a fitting force being obtained at least due to the returning force of the hinge portion so that the band can be expanded even with a small force and, in spite of the repeated use over a long period, the fitting force and winding action will not deteriorate and the band will not crack. The bands are connected symmetrically to both ends of a top band and are utilized as head bands for headphones.

20 Claims, 27 Drawing Figures

BAND AND THE HEADPHONE UTILIZING THE SAME

BACKGROUND OF THE INVENTION (a) Field of the Invention

This invention relates to bands and the like, more particularly to bands utilized for head bands for headphones, bands for wrist watches, bands for sphygmometers, bands for personal ornaments (such as hair bands and bracelets), bands for collars of dogs and cats, bands for belts of trousers, bands for tire chains and the like, and also relates to headphones having connecting bands.

(b) Description of Related Art

Conventional head bands known generally for headphones and the like are mostly kept in the form of horseshoe even when not in use as well as in use and have defects that they are bulky to carry and house, are inconvenient to carry and require housing spaces and their housing cases must be large.

The bands for wrist watches and the like are made generally of such flexible materials as metallic chains and plate-shaped plastics, require such locking members as fasteners and clips in being fitted and such locking members must be operated in fitting and removing the bands much to trouble.

Therefore, a headphone set (hereinafter simply referred to as "a headphone") having a band made easy to fit and remove and compact to house by solving such defects is mentioned in Japanese Utility Model Application No. 74970/1983 of a different inventor filed on May 19, 1983 published on Dec. 3, 1984, as SHO No. 59-180587 (hence, not prior art hereto) and assigned to the same assignee with the present application. This is formed as shown in FIG. 1 and its head band is formed of a top band 11 and side bands 10 which are extendable and contractible on both sides of this top band 11. The side band 10 is made by connecting many flat plate beam portions 12 in series in the form of a belt in the lengthwise direction, integrally bridging the flat plate beam portions adjacent to each other with a hinge 14 expanding to be in the form of V between them. Each side band 10 has a self-returning property so as to be wound inside so that the side pressure of a headphone unit 16 as fitted may be obtained by utilizing the resiliency of the hinge portions 14 when the side band 10 is expanded and the resiliency of the entire side band 10 generated in case the entire side band 10 flexes as if it were one beam when the hinge portions 14 are completely closed. When housed, as shown in FIG. 2, the side band 10 may be automatically spirally wound with the headphone unit 16 as a winding center.

However, there has been the disadvantage that, because the hinge portion 14 is V-shaped, a large force will be required to expand the side band 10 and the fitting and removing operations will not be made smoothly. Further, there has been another disadvantage that, when the side band 10 is expanded and wound, the folding part 14*a* of the hinge portion 14 will be locally flexed by the folding action, will be fatigued, will be reduced in the fitting force and winding action by the long use and will finally crack to be unable to use.

More particularly, when the head band is expanded, the fitting force F (the reaction Q on the side pressure) when the headphone is fitted around a head will act on the head band and this reaction Q will act as a bending moment M on the head band. The value of this bending moment will be different depending on the positions of the above mentioned many hinges. That is to say, a bending moment M corresponding to [Reaction Q]×[Distance (arm length) r between the hinge portion and reaction Q] will act on each hinge. In other words, when the headphone is fitted, the larger the distance of the hinge portion from the headphone unit 16, the larger the bending moment acting on the hinge portion. Thereby, if the thickness of each hinge portion 14 is the same as in the headphone shown in FIGS. 1 and 2 that is, if the second moment of inertia I in the above mentioned expanding direction is the same, the larger the distance of the hinge portion from the headphone unit 16, the larger the normal stress acting on the hinge portion and the stress. Therefore, the larger the distance of the hinge portion from the headphone unit 16, the more likely to occur the permanent strain and the loss of the winding returning property.

The hinge portion 14 is required to be able to be expanded with a small operating force when the head band is to be expanded and to have a self-returning property in order to realize an automatic winding operation when the head band is to be housed.

Particularly, when the flexing operation of the hinge portion 14 when the head band is to be expanded is considered from the aspect of the stress $\delta$—strain $\epsilon$ characteristics, if the difference between the working normal stress caused by the expanding force or fitting force F of the head band and the allowable normal stress of the hinge portion 14 of the head band is small, the stress acting on the hinge portion 14 may exceed the elastic limit and thereby the permanent set will be likely to be caused. Under such condition, the automatic winding function of the head band will be impaired and the fittabilty of the headphone will reduce. From such viewpoint, in the V-shaped hinge portion, the difference between the normal stress (the stress produced while the hinge portion 14 reaches the stated in FIG. 1 from the state in FIG. 2) caused by the expanding force or fitting force F of the head band and acting in the usual using condition and the allowable normal stress (yield point) is so small that, when the head band is repeatedly expanded and wound by the long use, the permanent set of the hinge portion 14 has been likely to occur. Such problem has occurred not only in case such formation is applied to head bands for headphones but also in case it is applied to bands for wrist watches and other bands.

SUMMARY OF THE INVENTION

A primary object of the present invention is to provide a band which can be expanded even with a small force, does not deteriorate in the fitting force and winding action in spite of the repeated use over a long period and does not crack.

This object is attained by forming hinge portions to be arcuate. Thereby, the band can be smoothly expanded even with a small force. As the entire hinge flexes, no local fatigue will be produced and the strain will be small. As a result, the fitting force and winding force will not reduce and the hinge portions will not crack.

Another object of the present invention is to provide a band wherein the second moment of inertia of the hinge portion is made much smaller than the second moment of inertia of the beam portion, the strain acting on the hinge portion is made small and the apparent elastic limit as a whole can be improved.

A further object of the present invention is to provide a band wherein the bending moments acting on the respective hinge portions are made substantially identical so that the permanent set by the local plastic deformation can be prevented, a stable fitting force is guaranteed even in the use for a long time and the expanding operation can be made smoothly.

A still further object of the present invention is to provide a headphone wherein the above mentioned bands are used and the housing and fitting operations can be made very simply and smoothly.

These and other objects of the present invention will become more apparent during the course of the following detailed description and appended claims.

DESCRIPTION OF THE PREFERRED EMBODIMENT

The embodiment of this invention shall be explained in the following with reference to the accompanying drawings. Here, the invention shall be explained as applied to a head band for a headphone.

Figure 4:
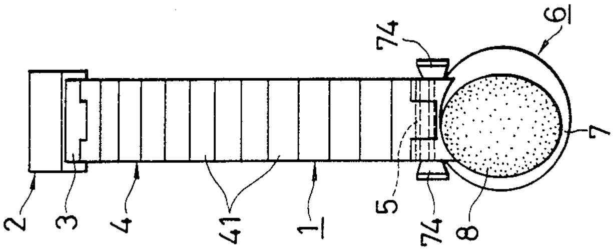
FIG. 4 is a side view of the headphone in FIG. 3.
Figure 3:
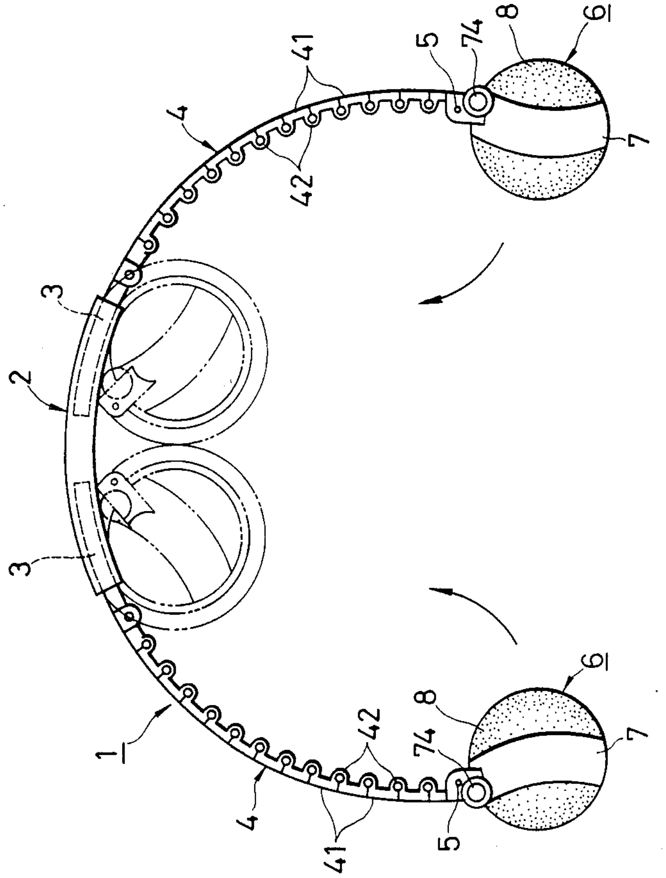
FIG. 3 is an elevation showing the fitted or using state of an embodiment of the headphone according to the present invention.

FIGS. 3 and 4 are respectively an elevation and side view of a fitted state showing an embodiment of the headphone to which the present invention is applied. This headphone 1 is formed of a top band 2, a pair of side band 4 made of such thermoplastic polyester as, for example, "Hytrel" (trade name) of Du Pont Co. and inserted in and engaged with this top band 2 in both end parts through adjusting belts 3 and later described clicking means related with the adjusting belts 3 so as to be adjustably extended and contracted in response to the level of ears in the lengthwise direction in the respective end parts and headphone units 6 pivoted foldably and rotatably inward through pivot pins 5 at the respective free ends of both side bands 4. These headphone units 6 include supporting cases 7 pivoted foldably and rotatably inward in the free end parts of the side bands 4 respectively through the above mentioned pivot pins 5, driver units (not illustrated) built-in in these supporting cases 7 and spherical outer fitted cases 8 secured to the supporting cases 7 so as to respectively enclose the driver units. The parts located inside the outer fitted cases 8 are formed of such acoustically transparent and soft material as polyurethane foams so as to be used also as ear pads.

Figure 5:
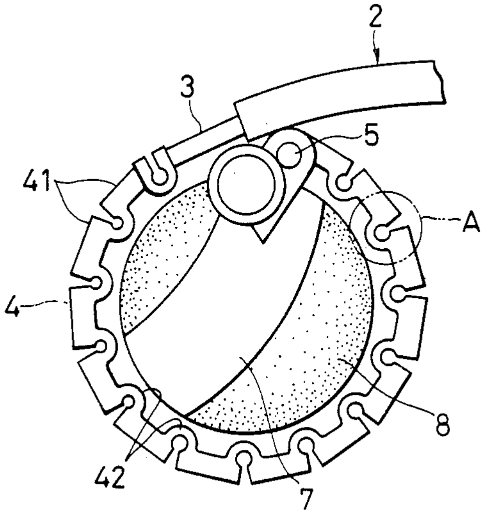
FIG. 5 is a magnified elevetion of an essential part showing the wound state when not in use of the headphone in FIG. 3.
Figure 6:
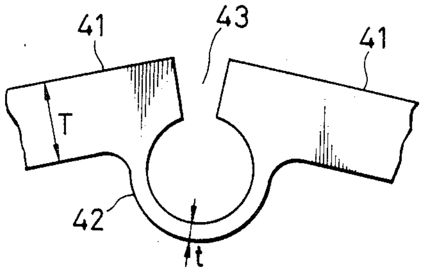
FIG. 6 is a magnified view of the A part in FIG. 5.

As shown in FIG. 5 and FIG. 6 magnifying the part A in FIG. 5, the above mentioned side band 4 is formed of many flat plate beam portions 41 arranged in the form of a belt in the lengthwise direction so as to be able to contact with the adjacent ones as expanded and substantially arcuated hinge portions 42 (in this embodiment, 12 hinge portions 42 are provided on each of the right and left) integrally bridging from inside the respective adjacent flat plate beam portions 41. These substantially arcuated hinge portions 42 act to separate the respective adjacent flat plate beam portions 41 from each other by their self-returning property so that, in case no expanding force is applied, the entire side band 4 may be automatically wound inward to be housed. As expanded, these hinge portions 42 will completely close as if the entire side band 4 were one beam so as to obtain a fitting force with the resiliency of the entire beam. As shown in FIG. 6, the shape of each hinge portion 42 is arcuated. By the way, the reference symbol t denotes a thickness of the hinge portions 42 and the reference numeral 43 denotes a slit formed by the self-returning property of hinge portion 42.

Figure 7A:
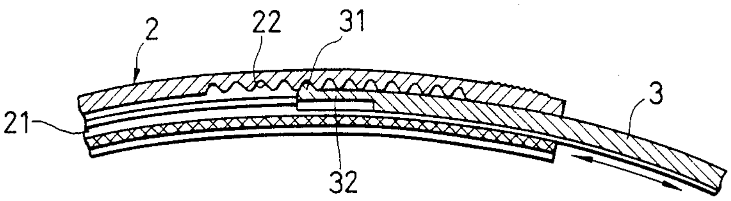
FIG. 7A is a magnified sectioned view of an essential part showing an example of the structure connecting a top band and adjusting belt with each other.
Figure 7B:
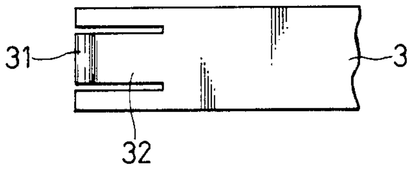
FIG. 7B is a plan view of the end part of the adjusting belt in FIG. 7A.
Figure 8:
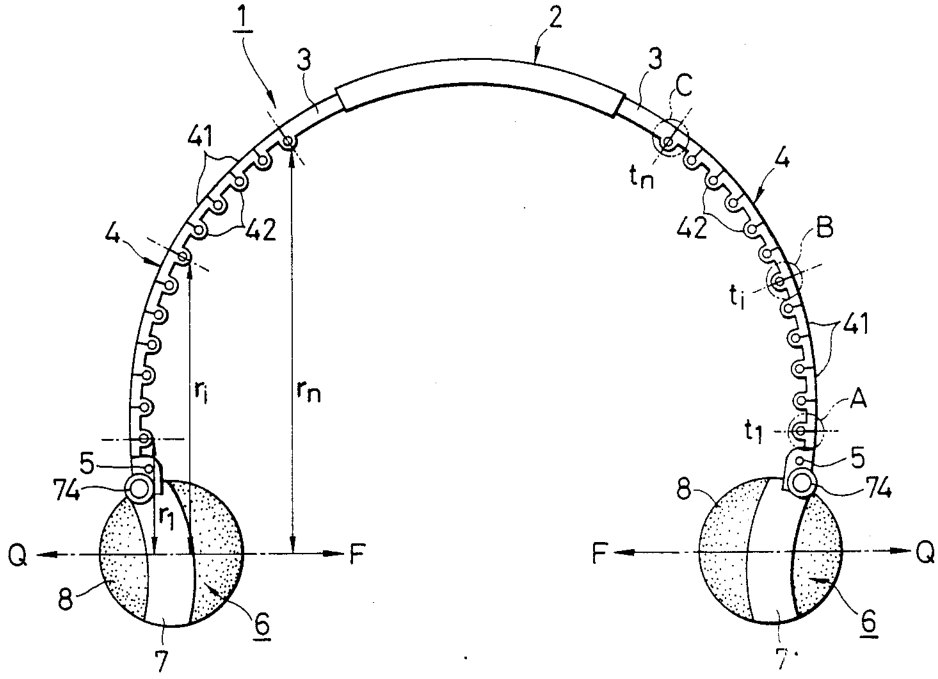
FIG. 8 is an explanatory view showing a bending moment acting on a hinge member forming the side band according to the present invention in the expanded state.

FIGS. 7A and 7B show a construction example of the above mentioned clicking means provided between the end part of the top band 2 and the adjusting belt 3. That is to say, a plurality of notches 22 arranged so as to be serrated in the cross-section are made on the upper wall of a guide hole 21 of the top band 2 into which the adjusting belt 3 is to be inserted and a tongue portion 32 having a projection 31 to be engaged with the notch 22 is formed as somewhat rising upward in the tip part of the adjusting belt 3. In this case, as the adjusting belt 3 is made of a flexible plastic or the like, when the adjusting belt 3 is inserted into the guide hole 21 of the top band 2, a resiliency tending to fit the projection 31 into the notch 22 will act on the tongue portion 32. Therefore, unless the adjusting belt 3 is pushed into or pulled out of the top band 2 with a force larger than certain magnitude, the adjusting belt 3 and top band 2 will remain combined with each other.

Figure 9A:
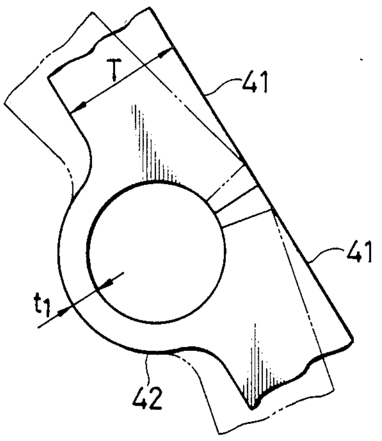
FIGS. 9A, 9B and 9C are explanatory views showing respectively the thicknesses of the respective hinge members in the A part, B part and C part in FIG. 8.
Figure 9B:
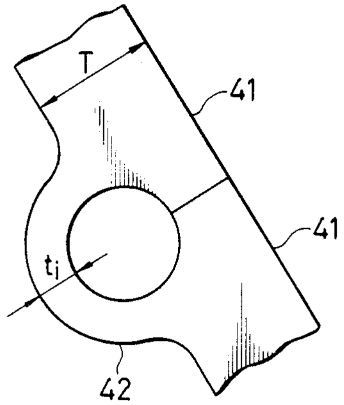
Figure 9C:
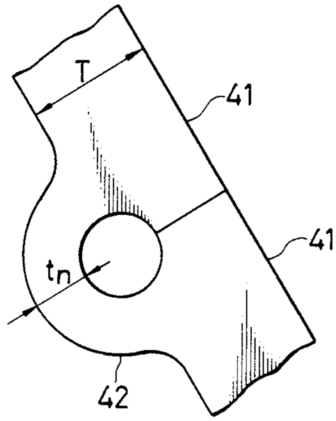

The feature of the formation of the above mentioned flat plate beam portion 41 and hinge portion 42 shall be explained in the following. As shown in FIG. 8 and FIGS. 9A-9C, the thickness t of each hinge portion 42 is made much thinner than the thickness T of the flat plate beam portion 41, its second moment of inertia is made much smaller than the second moment of inertia of the flat plate beam portion 41 and, the larger the distance ($r_1 < \ldots < r_i < \ldots < r_n$) of the hinge portion from the headphone unit 6 as expanded, the larger the thickness ($t_1 < \ldots < t_i < \ldots < t_n$) of the hinge portion 41. That is to say, FIGS. 9A, 9B and 9C show respectively as magnified the hinge portions 42 of the A part, B part and C part in FIG. 8. As evident from these drawings, the larger the distance of the hinge portion 42 from the headphone unit 6, the larger the thickness of the hinge portion and therefore the larger the distance of the hinge portion 42 from the headphone unit 6, the larger the second moment of inertia of the hinge portion 42.

Figure 10A:
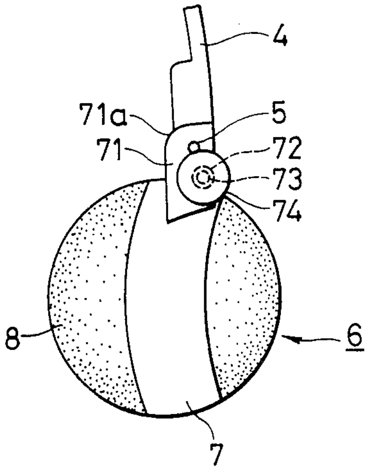
FIG. 10A is a magnified elevation of an essential part showing the headphone unit portion in FIG. 3.
Figure 10B:
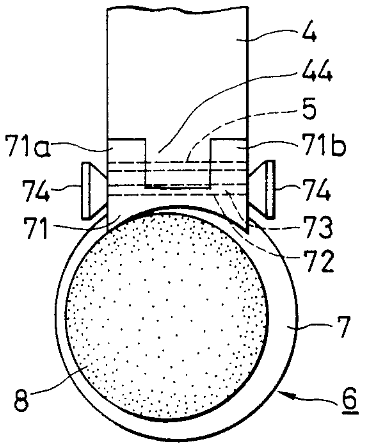
FIG. 10B is a side view of the headphone unit portion shown in FIG. 10A.
Figure 11:
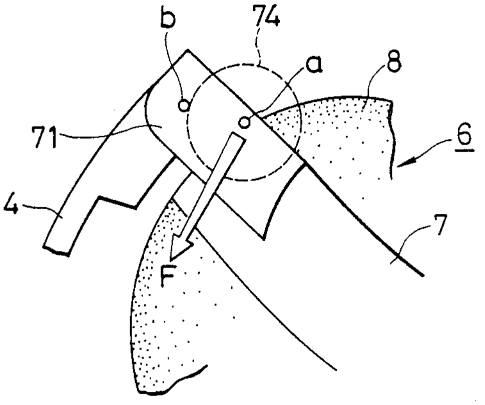
FIG. 11 is an explanatory view showing the positional relations of the operating point and pivoting point in the headphone unit portion shown in FIG. 10A.

The structure around the headphone unit 6 shall be explained in detail in the following with reference to FIGS. 10A, 10B and 11. A connecting portion 71 to the side band 4 is formed integrally with the supporting case 7 and pivoting portions 71*a*, 71*b* are formed on the tip side of this connecting portion 71. A pivoting portion 44 is formed on the tip side corresponding to the pivoting portions 71*a*, 71*b* of the side band 4. As shown in FIG. 10B, these pivoting portions 71*a*, 71*b* and 44 are connected in the form of a hinge through the pivot pin 5 so that the supporting case 7 may be connected to the side band 4 rotatably so as to be folded inside the side band 4. That is to say, in the connecting portion 71 of the supporting case 7, a through hole 42 is made in a position near the pivot pin 5, for example, in a position on the side separated from the side band 4 in respect of the position of the pivot pin 5. A pin 73 is inserted through this through hole 72 and operating grips 74 are secured to both ends of this pin 73 and are formed to be rotatable with respect to the supporting case 7.

The operation and function of the headphone of the above mentioned structure shall be explained in the following.

As mentioned above, the side bands 4 composing the headphone has a habit circularly curving with the fitting surface inside due to the returning force when not used. Therefore, when not used, in order to compact the entire headphone so as to be carried or housed, when, first of all, the side bands 4 are inserted into the top band 2 by predetermined lengths and then the headphone units 6 are directed toward the fitting surface sides of the side bands 4 and are folded substantially at right angles, due to the above mentioned curving habit, the side bands 4 will wind respectively with the headphone unit 6 as winding centers and will stay as spirally winding the headphone units 6 at both ends through the top band 2 (as shown with the two-point chain lines in FIG. 3). Such winding function of the side bands 4 is due to the returning forces of the side bands 4 themselves. However, in case there is a resistance to the winding function, if the user manually assists the winding function, the side bands 4 will be able to be smoothly wound. Once the side bands 4 are wound, unless they are forcibly pulled back, they will not develop to extend. However, in order to positively keep the headphone unit 6 wound respectively inside the side bands 4 and to prevent the side bands 4 from being deformed or hurt and to avoid the bad influence on the headphone unit 6, surface fasteners may be provided in the contact parts of the side bands 4 housed as wound to engage with each other, or the headphone unit 6 may be locked with the top band 2 through hooks or the like so that, unless the surface fasteners or hooks released, the side bands 4 may not develop to extend and may be kept wound.

In case the headphones are to be used as fitted, first the side bands 4 may be pulled out of the top band 2 so as to fit the shape of the head of the user and then may be pulled back so as to develop as extended while pressing with fingers the operating grips 74 located near the headphone unit 6 on both sides. While or after the side bands 4 develop to extend, if the headphone units 6 are folded back to the side band 4 sides so as to be directed in the lengthwise directions of the side bands 4, they will be able to be fitted. Thereafter, the length of the side bands 4 may be re-adjusted as required. In this state, due to the returning function of the side bands 4, the headphone will develop as lightly contacting the headphone units 6 with each other or making them approach each other. If the headphone units 6 are properly fitted while being lightly pushed to expand, they will be applied to the ears with a proper fitting side pressure due to the returning function of the side bands 4 and a comfortable listening will be able to be fully appreciated.

Figure 12:
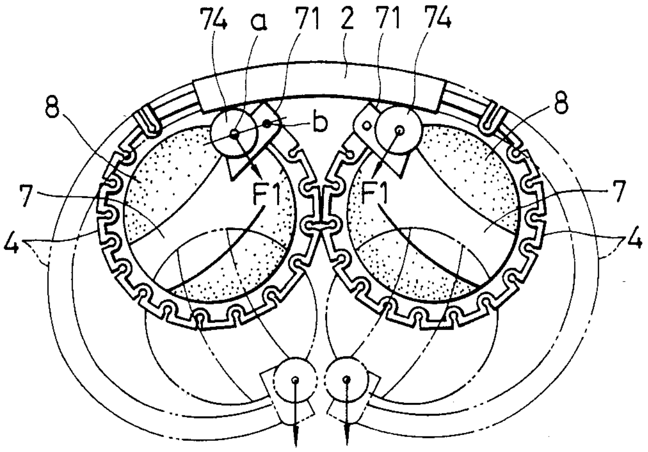
FIGS. 12 to 14 are explanatory views showing a series of operations from the non-fitted state to the fitted state of the headphone according to the present invention.

The operation of the headphone units 6 in such headphone developing and housing process as is described above shall be explained more in detail in the following. Hereinafter, as shown in FIG. 11, the position of the pin 73 shall be called an operating point a and the position of the pivot pin 5 shall be called a pivoting point b. Therefore, from the position relation of the respective pins 5 and 73 described above, it is found that the position of the operating point a is set to be in a position near the pivoting point b and more separated from the side band 4 with respect to this pivoting point b and that the operating force F applied to these operating grip is once transmitted to the headphone unit 6 side through the pin 73 (operating point a) and is further transmitted to the side band 4 through the pivot pin 5 (pivoting point b) from this headphone unit 6 side. In expanding the side bands 4 from the housed state, both right and left operating grips 74 are gripped respectively with the thumbs and index fingers of both hands and, at first, as shown in FIG. 12, a force $F_1$ is applied downward substantially obliquely to the inside to relax the wound state. In this case, as the operating point a of the force $F_1$ is in a position relation tending to fold the headphone unit 6 more to the inside with respect to the pivoting point b, the headphone unit 6 will not substantially relatively separate on the free end side of the side band 4 and mostly the wound state of only the side band 4 near the engaging part with the top band 2 will be relaxed. (See the broken line state in FIG. 12.)

Figure 13:
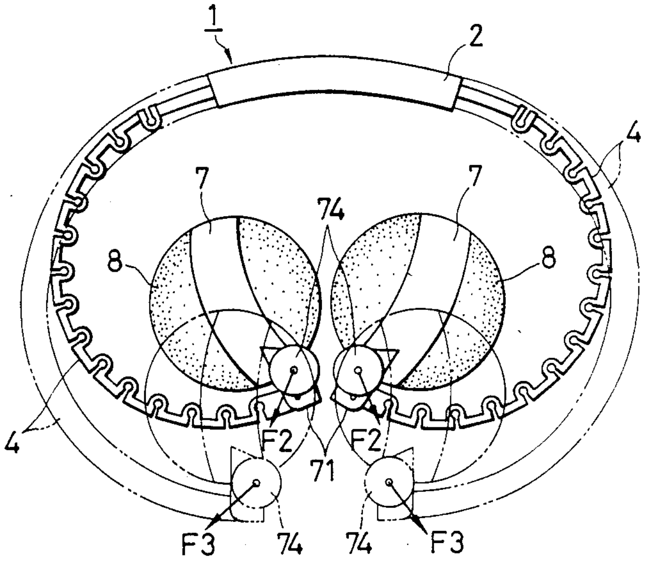
Figure 14:
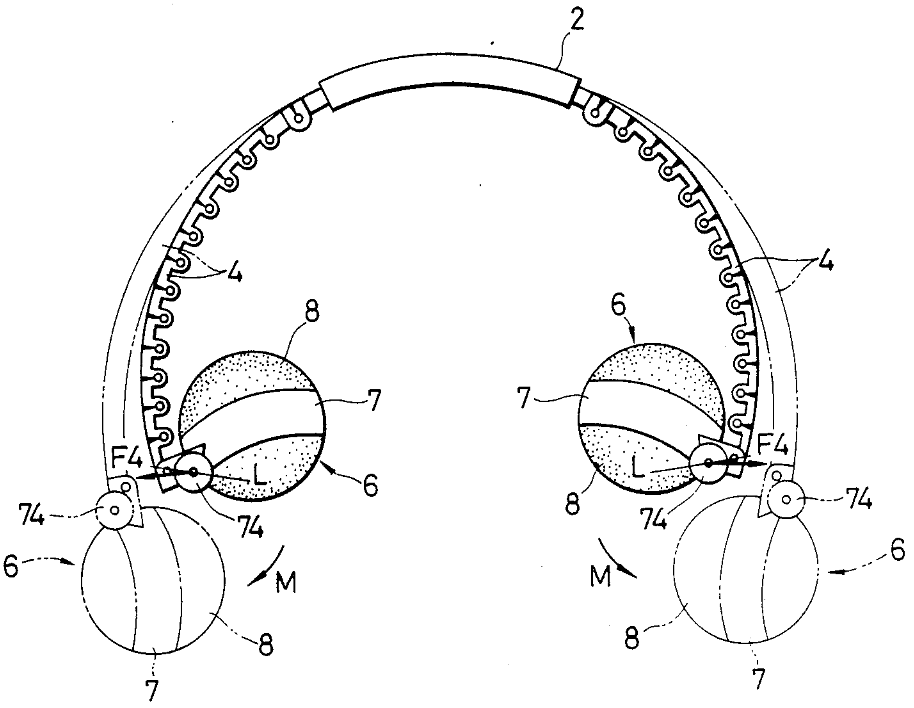

Then, with the rotation of the headphone unit 6, the direction of the force applied to the operating grips 74 will be gradually directed outward so as to be in the state of $F_2$ shown in FIG. 13. Through the state shown with the broken lines in FIG. 13, it will be possible to separate the operating grips 74 outward from each other, that is, to apply a pulling expanding force $F_3$. If expanded in this state, the side band 4 will be more quickly unwound from around the supporting case 7 and headphone unit 6. When the direction of the expanding force $F_4$ coincides with the straight line L connecting the pivot pin 5 and pin 73, that is, past the position in which the operating point a becomes a dead point for the pivoting point b, the component of this expanding force $F_4$ will become a force rotating the above mentioned supporting case 6 outward with the above mentioned pivoting point b as a center and therefore, as shown by the arrow M in FIG. 14, the headphone unit 6 will automatically rotate relatively reversely to the side band 4. Thereby, the shape of the headphone will approach the fittable state. (See the solid line state in FIG. 3 and the broken line state in FIG. 14.) Thus, as described above, when the headphone is fitted to the head, both hands will be separated from the operating grips 74. In housing the headphone from the fitted state, when the operating grips 74 are gripped with the thumbs and index fingers of both hands, both side bands 4 are expanded a little outward and are removed from the head of the listener and the expanding forces of both hands are a little relaxed, the headphone units 6 will contact each other, thereby the forces folding the headphone units 6 inward will act. Thereafter, by only weakening the expanding forces of both hands, in the proceduce reverse to that described above, both side bands 4 will be automatically wound respectively around the headphone units 6 due to the self-returning property and the entire headphone will be compactly housed.

Here, the relations of the wound and expanded states and fitting force of the side bands 4 shall be explained.

Figure 15:
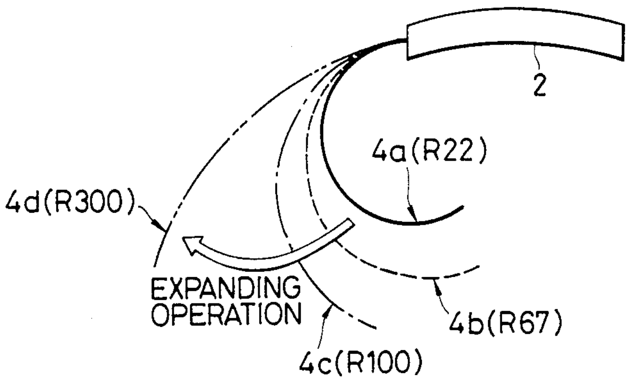
FIG. 15 is an explanatory view showing a process from the wound state to the expanded state of the side band in the headphone in FIG. 3.
Figure 16:
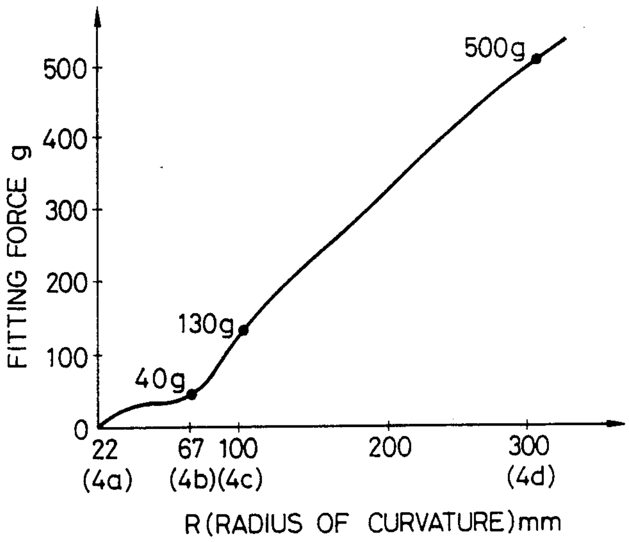
FIG. 16 is a graph showing the relation between the radius of curvature and fitting force of the side band in the respective states in FIG. 15.

In case the side band 4 is expanded as shown respectively by 4*a*, 4*b*, 4*c* and 4*d* in FIG. 15, the fitting force in the respective states will vary as shown in FIG. 16. The respective states shall be explained.

(1) State of 4*a* (radius of 22 mm.)

Figure 17A:
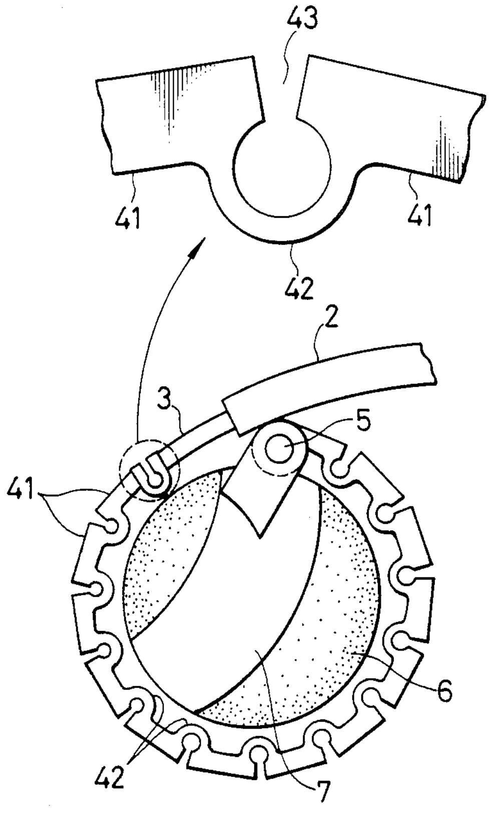
FIGS. 17A, 17B and 17C are partial views showing respectively the states of the side band in the respective states in FIG. 15.

As shown in FIG. 17A, the headphone unit 6 is wound in. In this state, as the slit 43 of the hinge portion 42 is opened, the side band 4 can be expanded with a light force.

(2) State of 4*b* (radius of 67 mm.)

Figure 17B:
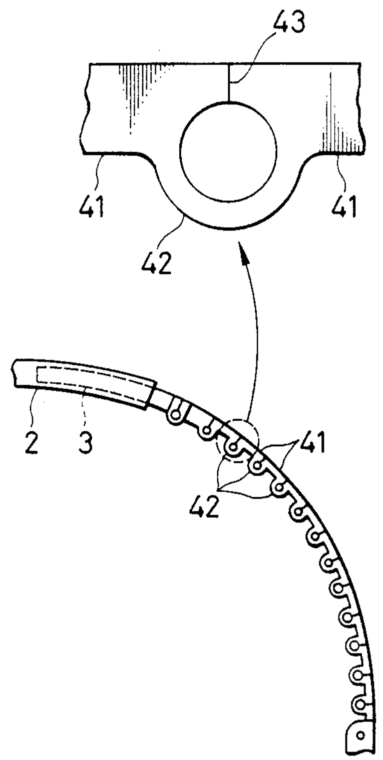

When the side band 4 is expanded from the state of 4*a* in FIG. 15, the slit 43 of the hinge portion 42 will gradually close to be in the state of 4*b* as shown in FIG. 17B.

(3) State of 4*c* (radius of 100 mm.)

Figure 17C:
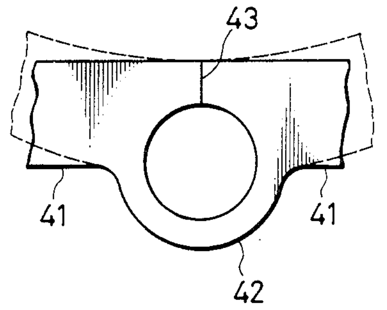

When the side band 4 is further expanded from the state of 4*b* in FIG. 15, the beam portion 41 will flex as shown in FIG. 17C. At this time, the entire side band 4 will act to flex as if it were one beam and the expanding force, that is, the fitting force will be extremely large. This state corresponds substantially to the state of fitting the headphone to the head.

(4) State of 4*d* (radius of 300 mm.)

In case the headphone is to be fitted to the head or it to be removed from the head, the side band 4 is expanded to be of a radius of about 300 mm. At this time, too, the same as in the state of 4*c* in FIG. 15, the entire side band 4 will act to flex as a beam but the material will not yet have come to be plastically deformed.

Figure 1:
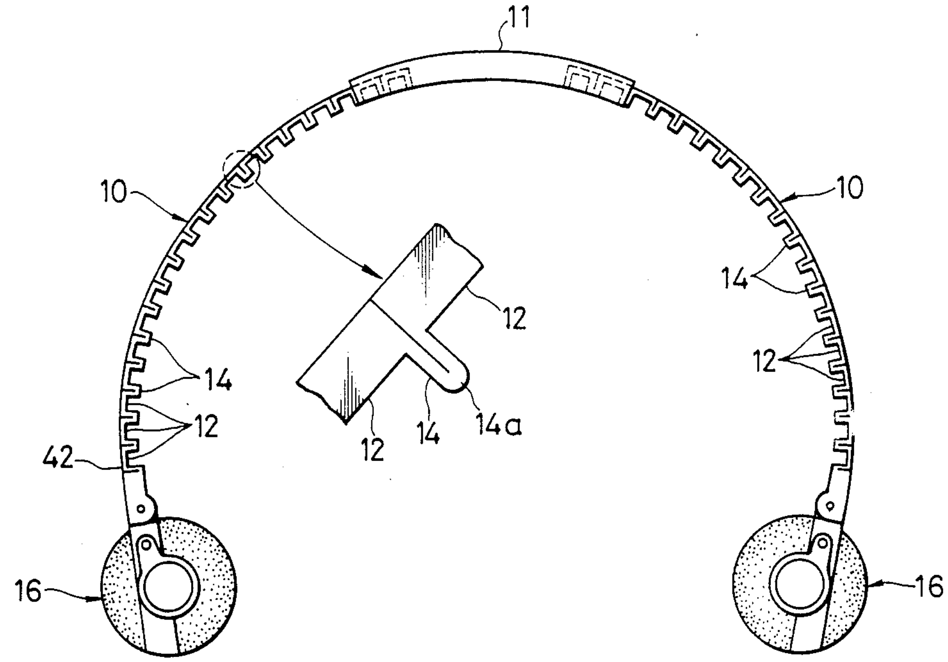
FIG. 1 PRIOR ART
FIG. 1 is an elevation showing the fitted or using state of a headphone using bands of a related structure.
Figure 2:
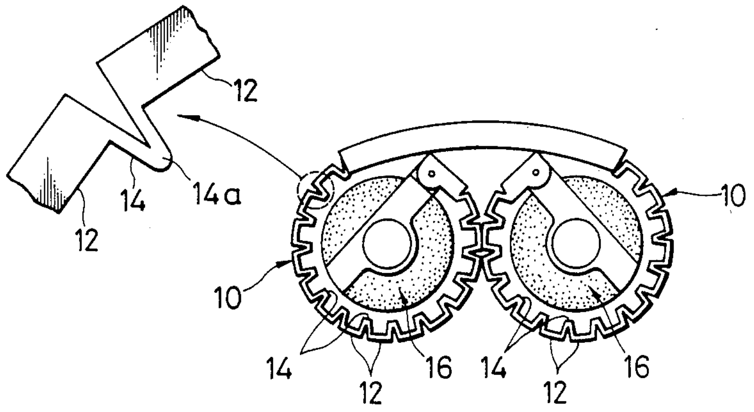
FIG. 2 PRIOR ART
FIG. 2 is an elevation showing the wound state when not in use of the headphone in FIG. 1.
Figure 18A:
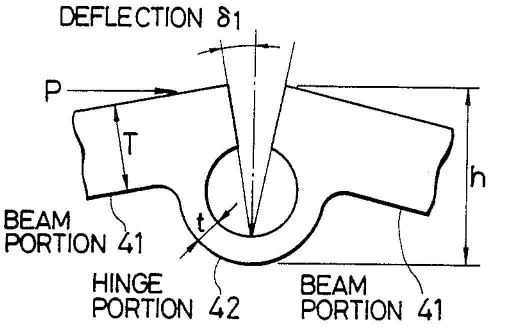
FIGS. 18A, and 18B are magnified views respectively of the hinge portions 42 and 14 in FIGS. 3 and 1.
Figure 18B:
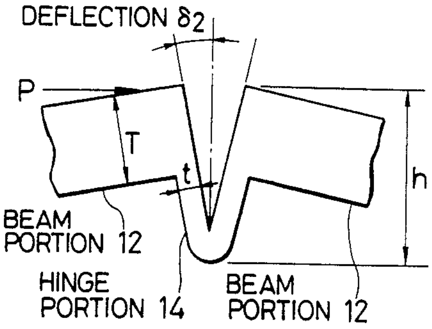
Figure 19A:
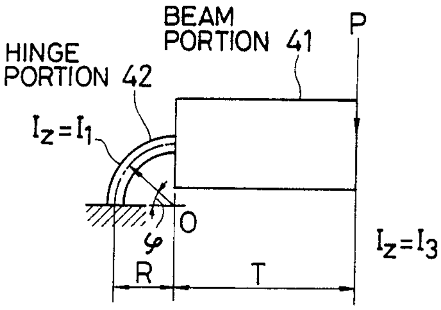
FIGS. 19A and 19B are explanatory views respectively of FIGS. 18A and 18B as modeled for dynamical analysis.
Figure 19B:
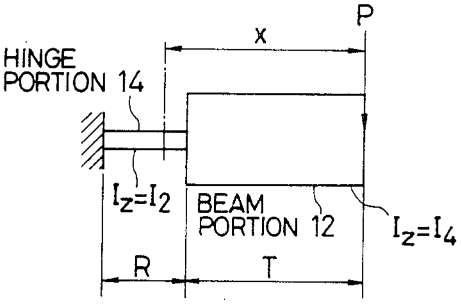

In the following, the strain generated in the hinge poriton 42 when the side bands 4 are expanded and the hinge portion 42 closes shall be considered by comparing the embodiment of the present invention shown in FIG. 3 and the prior art shown in FIG. 1 with each other. First of all, the arcuate hinge portion of the present invention shown in FIG. 18A and the conventional shaped hinge portion 14 shown in FIG. 18B shall be replaced respectively with such models for dynamic analysis as are shown in FIGS. 19A and 19B. First, the arcuate hinge portion 42 of the present invention shall be considered. When the bending elastic strain energy acting on the hinge portion 42 and beam portion 41 is represented by $\overline{U}$, $$\overline{U} = \int_0^S \frac{M^2}{2EI_z} \cdot ds$$

wherein

M: Bending moment

E: Young's modules $I_z$: Second moment of inertia

S: Length along the beam

By the theorem of Castiliano, the deflection $\delta_1$ at the loaded point (free end) by the load P is $$\delta_1 = \frac{\delta \overline{U}}{\delta P} = \frac{1}{EI_z} \cdot \int_0^S M \cdot \frac{\delta M}{\delta P} \cdot ds$$

Here, if the distance s from the loaded point to each cross-section is replaced with rectangular coordinates (x, y) and ultimate frictions (a, $\phi$), in the hinge portion 42, $$I_z = I_1$$

$$ds = R \cdot d\phi \left( 0 \leqq \phi \leqq \frac{\pi}{2} \right)$$

$$M = P(T + R\cos\phi)$$

in the beam portion 41, $$I_z = I_3$$

$$ds = dx (0 \leqq x \leqq T)$$

$$M = P \cdot x$$

and, therefore, $$\delta_1 = \frac{1}{EI_1} \int_0^{\pi/2} (T + R\cos\phi)^2 \cdot R d\phi + \frac{1}{EI_3} \int_0^T Px \cdot dx$$

$$\approx \frac{PR}{EI_1} \int_0^{\pi/2} (T + R\cos\phi)^2 \cdot d\phi (\because I_1 << I_3 \approx \infty)$$

$$= \frac{PR}{EI_1} \int_0^{\pi/2} (T^2 + 2TR\cos\phi + R^2\cos^2\phi)\, d\phi$$

$$= \frac{PR}{EI_1} \cdot \left[ T^2\phi + 2TR\sin\phi + R^2 \left( \frac{1}{4} \sin 2\phi + \frac{4}{2} \right) \right]_0^{\pi/2}$$

$$= \frac{PR}{EI_1} \left( \frac{\pi}{2} T^2 + 2RT + \frac{\pi}{4} R^2 \right)$$

The conventional V-shaped hinge portion 14 shall be considered in the following. If the bending elastic strain energy acting on the hinge portion 14 and beam portion 12 is represented by $\overline{U}$, $$\bar{U} = \int_0^T \frac{M^2}{2EI_4} dx + \int_T^{T+R} \frac{M^2}{2EI_2} \cdot dx$$

By the theorem of Castiliano, the deflection $\delta_2$ of the loaded point (free end) by the load P is $$\delta_2 = \frac{\delta \bar{U}}{\delta P} = \frac{1}{EI_4} \int_0^T M \frac{\delta M}{\delta P} dx + \frac{1}{EI_2} \int_T^{T+R} M \frac{\delta M}{\delta P} dx$$

wherein $$M = P \cdot x (0 \leqq x \leqq T + R)$$

$$I_2 << I_4$$

and, therefore, $$\delta_2 \approx \frac{1}{EI_2} \int_T^{T+R} Px \cdot dx^2$$

$$= \frac{P}{EI_2} \left[ \frac{1}{3} x^3 \right]_T^{T+R}$$

$$= \frac{P}{3EI_2} \{(T+R)^3 - T^3\}$$

$$= \frac{P}{3EI_2} (T^3 + 3T^2R + 3TR^2 + R^3 - T^3)$$

$$= \frac{P}{3EI_2} (R^3 + 3R^2T + 3RT^2)$$

$$= \frac{PR}{3EI_2} (R^2 + 3RT + 3T^2)$$

The deflections $\delta_1$ and $\delta_2$ under the same load P shall be compared and investigated in the following $$\delta_1 = \frac{PR}{EI_1} \left( \frac{\pi}{4} R^2 + 2RT + \frac{\pi}{2} T^2 \right)$$

$$\delta_2 = \frac{PR}{3EI_2} (R^2 + 3RT + 3T^2)$$

Here, if the dimensions (R, T) and material (E) are assumed to be equal, $$\delta_1 \approx \left( \frac{\pi}{4} R^2 + 2RT + \frac{\pi}{2} T^2 \right) / I_1$$

$$\delta_2 \approx (R^2 + 3RT + 3T^2)/3I_2$$

If $R+T=1$ $(0 \leqq T \leqq 1)$ in order to normalise them, $$\delta_1 \approx \left\{ \frac{\pi}{4} (1-T)^2 + 2(1-T)T + \frac{\pi}{2} T^2 \right\} / I_1$$

$$\approx \left\{ \frac{\pi}{4} (1 - 2T + T^2) + 2(1-T)T + \frac{\pi}{2} T^2 \right\} / I_1$$

-continued $$\approx \left\{ \left( \frac{\pi}{4} + \frac{\pi}{2} - 2 \right) T^2 + \left( 2 - \frac{\pi}{2} \right) T + \frac{\pi}{4} \right\} / I_1$$

$$\approx (0.355T^2 + 0.43T + 0.785)/I_1$$

$$\delta_2 \approx \{(1-T)^2 + 3(1-T)T + 3T^2\}/3I_2$$

$$\approx (1 - 2T + T^2 + 3T - 3T^2 + 3T^2)/3I_2$$

$$\approx (T^2 + T + 1)/3I_2$$

$$\approx (0.333T^2 + 0.333T + 0.333)/I_2$$

Here if $(\delta_1 - \delta_2)$ is considered, $$\delta_1 - \delta_2 = (0.355 - 0.333)T^2 + (0.43 - 0.333)T + (0.785 - 0.333)$$

$$= 0.022T^2 + 0.097T + 0.452$$

$$y = T^2 + \frac{0.097}{0.022} \cdot T + \frac{0.452}{0.022}$$

$$\approx T^2 + 4.4T + 20.5$$

On this formula, if the discriminant $$D = b^2 - 4ac$$

of the quadratic equation $$y = aT^2 + bT + c$$

is seen, $$D < 0.$$

Thus, it is found that the deflection $\delta_1$ is always larger than the deflection $\delta_2$. This shows that the arcuate hinge portion 42 of the present invention is easier to flex than the conventional V-shaped hinge portion 14 and means that the bands can be expanded with a smaller force. In other words, this means also that, in order to obtain the same deflection $(\phi_1 = \phi_2)$ with the same load P, the second moments of inertia $I_2$ of the hinge portion 42 and 14 must be $I_1 > I_2$. The strain $\epsilon$ is represented by $$\epsilon = \frac{M \cdot e}{E \cdot I_z}$$

wherein e: Distance between the neutral axis and outermost part, corresponding to ½ the thickness t of the hinge portion, that is, t/2 in this case.

Therefore, if the strains of the arcuate hinge portion 42 of the present invention and the conventional V-shaped hinge portion 14 are represented respectively by $\epsilon_1$ and $\epsilon_2$, under the condition of $I_1 > I_2$, $\epsilon_1 < \epsilon_2$. It is found that, in the arcuate hinge portion 42 of the present invention, the strain is smaller. Thereby, when the hinge portion 42 is arcuated and the second moment of inertia of the hinge portion 42 is made much smaller than the second moment of inertia of the beam portion 41, the strain produced in the hinge portion 42 with the expanding operation of the hinge portion 42 will be able to be made smaller than in the case of the conventional structure.

Further, as described above, the larger the distance of the hinge portion 42 from the headphone unit 6, the larger the second moment of inertia of the hinge portion 42. Therefore, though the larger the distance of the hinge portion 42 from the headphone units, the larger the bending moment acting on the hinge portion 42, when the headphone is fitted (when the side bands 44 are expanded), the normal stress δ acting on each hinge portion 42 will be substantially constant. Therefore, there is no such fear that, as in the formation shown in FIG. 1, the nearer to the top band, the larger the normal stress, a local plastic deformation will be produced and the self-returning property of the hinge portion 14 will deteriorate. Also, as the hinge portion 42 is formed to be substantially arcuated, as already described, the deflection with the bending moment can be made large, the strain of the hinge portion becomes small and the range of the apparent elastic deformation of the entire head band can be expanded.

By the way, in the above mentioned embodiment, the present invention is shown as applied to the head band of the headphone but can be applied also to band for wrist watches and other various bands.

What is claimed is:

1. a headphone comprising an arcuate top band member having two ends, a pair of side band members each connected to an end of said top band member and comprising a plurality of beam portions and arcuate hinge portions integrally interconnecting the adjacent beam portions so that said beam portions and arcuate hinge portions are alternately arranged, and headphone units pivoted rotatably inward respectively to the free ends of said pair of side band members, said hinge portions having returning forces to obtain fitting forces symmetrical with respect to said top band member which act to wind and curve said side band members.

2. A headphone according to claim 1 wherein said pair of side band members are in telescopic connection with the ends of said top band member.

3. A headphone according to claim 2 wherein said side band members are connected to said top band member through a clicking member provided between them.

4. A headphone according to claim 1 wherein the hinge portions are made of a thermoplastic elastomer.

5. A headphone according to claim 4 wherein said thermoplastic elastomer is a polyester elastomer.

6. A headphone according to claim 1 wherein the hinge portions have second moments of inertia and, in each of said side band members, the larger the distance of each hinge portion from the corresponding headphone unit, the larger the second moment of inertia thereof.

7. A headphone according to claim 1 wherein the hinge portions have thickness and, in each of said side band members, the larger the distance of each hinge portion from the corresponding headphone unit, the larger the thickness thereof.

8. A headphone according to claim 1 further comprising operating grips for the headphone units which in use also exert side band member expanding forces each grip being rotatably supported in a position near the point at which the corresponding headphone unit is pivoted to the corresponding side band member, each headphone unit being turned outward when the direction of the corresponding side band member expanding force acting on the corresponding grip passes over the point which such force exerts no action to pivot the corresponding unit about said pivoting point.

9. A band comprising a plurality of beam portions and arcuate hinge portions integrally interconnecting the adjacent beam portions so that said beam portions and arcuate hinge portions are alternately arranged, said hinge portions having a returning force which has an action of winding and curving said band.

10. A band according to claim 9 wherein said hinge portions and said beam portions have a second moment of inertia, the second moment of inertia of said hinge portions being smaller than the second moments of inertia of said beam portions.

11. A band according to claim 9 wherein said hinge portions and adjacent beam portions have a thickness, the thickness of said hinge portions being less than that of said adjacent beam portions.

12. A band according to claim 9 wherein said hinge portions integrally bridge said beam portions adjacent to each other from the inner side of the band.

13. A band according to claim 1 wherein the hinge portions are made of a thermoplastic elastomer.

14. A band according to claim 13 wherein said thermoplastic elastomer is a polyester elastomer.

15. A band comprising a pair of side band members each comprising a plurality of beam portions and arcuate hinge portions integrally interconnecting the adjacent beam portions so that said beam portions and arcuate hinge portions are alternately arranged, said hinge portions having returning forces that obtain symmetrical fitting forces which act to wind and curve said band.

16. A band according to claim 15 wherein said hinge portions and said beam portions have second moments of inertia, the second moment of inertia of said hinge portions being smaller than the second moments of inertia of said beam portions.

17. A band according to claim 15 wherein the hinge portions and beam portions have thickness and the thickness of said hinge portions is less than the thickness of the adjacent beam portions.

18. A band according to claim 15 wherein said hinge portions bridge said beam portions adjacent to each other, from the inner side of the band.

19. A band according to claim 15 wherein the portion producing said returning force is made of a thermoplastic elastomer.

20. A band according to claim 19 wherein said thermoplastic elastomer is a polyester elastomer.

* * * * *